(12) United States Patent
Minne

(10) Patent No.: US 7,594,109 B2
(45) Date of Patent: Sep. 22, 2009

(54) DIGITAL CONTENT DISTRIBUTION SYSTEM

(75) Inventor: Mark W. Minne, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 783 days.

(21) Appl. No.: 10/744,805

(22) Filed: Dec. 23, 2003

(65) Prior Publication Data
US 2005/0138654 A1    Jun. 23, 2005

(51) Int. Cl.
H04L 29/06    (2006.01)
G06F 21/00    (2006.01)
H04K 1/00    (2006.01)

(52) U.S. Cl. .................... 713/162; 705/51; 705/52; 705/59; 380/255

(58) Field of Classification Search ............... 380/278, 380/210, 286; 705/51, 52, 59; 713/163
See application file for complete search history.

(56) References Cited

U.S. PATENT DOCUMENTS

| | | | |
|---|---|---|---|
| 6,160,585 A | 12/2000 | Schmidt et al. | |
| 6,175,628 B1 | 1/2001 | Reinold et al. | |
| 6,189,008 B1 | 2/2001 | Easty et al. | |
| 6,363,149 B1 | 3/2002 | Candelore | |
| 6,448,987 B1 | 9/2002 | Easty et al. | |
| 6,651,250 B1* | 11/2003 | Takai | 725/31 |
| 2001/0047349 A1 | 11/2001 | Easty et al. | |
| 2002/0037081 A1* | 3/2002 | Rogoff et al. | 380/278 |
| 2002/0049679 A1* | 4/2002 | Russell et al. | 705/52 |
| 2002/0077988 A1* | 6/2002 | Sasaki et al. | 705/59 |
| 2002/0078176 A1 | 6/2002 | Nomura et al. | |
| 2002/0078456 A1 | 6/2002 | Hudson et al. | |
| 2002/0083006 A1 | 6/2002 | Headings et al. | |
| 2002/0129249 A1* | 9/2002 | Maillard et al. | 713/172 |
| 2002/0143565 A1 | 10/2002 | Headings et al. | |
| 2002/0143647 A1 | 10/2002 | Headings et al. | |
| 2002/0143782 A1 | 10/2002 | Headings et al. | |
| 2002/0144283 A1 | 10/2002 | Headings et al. | |
| 2003/0026424 A1* | 2/2003 | McGarrahan et al. | 380/255 |
| 2003/0068046 A1* | 4/2003 | Lindqvist et al. | 380/277 |
| 2003/0140348 A1* | 7/2003 | Stewart | 725/101 |

(Continued)

OTHER PUBLICATIONS

"Consumer Power", NDS, pp. 1-2, (1999). <www.nds.com>.

(Continued)

*Primary Examiner*—Shin-Hon Chen (57) ABSTRACT

A digital content distribution system comprises a high definition television broadcaster and a consumer media unit. The high definition television broadcaster comprises a high definition television transmitter configured for multicasting, on a repeating periodic basis, an encrypted terrestrial high definition television signal of a plurality of encrypted digital content selections for purchase. The consumer media unit comprises a high definition television tuner, a memory, and an encryption and content manager. The high definition television tuner is configured for receiving the encrypted terrestrial high definition television signal. The memory is configured for storing the encrypted digital content selections from the signal for selective purchase at the consumer media unit. The encryption and content manager is configured for receipt of a decryption key from the broadcaster via a return communication link, upon electronic payment to the broadcaster for purchase of at least one of the plurality of digital content selections, to permit access to the purchased at least one encrypted digital content selection stored in the memory of the consumer media unit.

20 Claims, 6 Drawing Sheets

U.S. PATENT DOCUMENTS

2004/0052380 A1* 3/2004 Sprunk ............... 380/286
2004/0163135 A1* 8/2004 Giaccherini et al. ......... 725/136
2006/0155989 A1* 7/2006 Nishimoto et al. .......... 713/166
2007/0168287 A1* 7/2007 McCarthy et al. ............. 705/51

OTHER PUBLICATIONS

"Integrated Datacasting Solutions for Digital Television", Motorola, pp. 1-13, (1999, 2001).

Malcolm Long, "ABA Broadcasting Planning—2001 A Digital Odyssey", ABA Media, pp. 1-8, (2001) <www.aba.gov.au>.

John V. Pavlik, "Digital Television: The Promise and the Peril", Television Quarterly, pp. 1-10, (2001), <www.emmyonline.com>.

Mike Wood, "Dish Network Model 6000 HD-DBS Receiver", Home Theater, pp. 1-3, (2001) <www.hometheatermag.com>.

Dan Odenwald, "FCC Okays Revenue Services in Digital TV Bitstream", Current, pp. 1-5, (2001) <www.current.org>.

Jack Kolesar, "AccessDTV HDTV Tuner Card", AMD Power, pp. 1-7, (2001), <www.amdpower.com>.

"Digital Media Receiver System", AccessDTV, pp. 1, (2002), <www.accessdtv.com>.

* cited by examiner

DIGITAL CONTENT DISTRIBUTION SYSTEM

BACKGROUND

The insatiable demand for entertainment continues to drive technology. Movies are available on VHS, DVD, as well through pay-per-view via cable, satellite, or internet. Governments and large corporations also help to create and fuel this demand by developing new paradigms for transmitting the content.

One of the latest movements in the entertainment industry is the push for digital television, including High Definition Television commonly known as HDTV. Even the federal government, through the Corporation for Public Broadcasting, is at the center of this latest television revolution. Most major television markets currently include at least one active terrestrial and/or satellite HDTV channel with HDTV programming. This new High Definition Television standard dramatically improves picture resolution, while also permitting multiplexing (also called multicasting), which is dividing up a single HDTV broadcast signal into multiple, simultaneous broadcast signals. While dividing up the single HDTV signal will cause a lower resolution for each of the resulting signals, their resolution will still be much better than the resolution available under the current analog television broadcast standard (known as NTSC).

While HDTV will bring more flexibility in broadcasting through multiplexing and a greater resolution to the broadcasted content, High Definition Television remains a new frontier that is largely unexplored.

SUMMARY

One aspect of the present invention provides a digital content distribution system comprising a high definition television broadcaster and a consumer media unit. The high definition television broadcaster comprises a high definition television transmitter configured for multicasting, on a repeating periodic basis, an encrypted terrestrial high definition television signal of a plurality of encrypted digital content selections for purchase. The consumer media unit comprises a high definition television tuner, a memory, and an encryption and content manager. The high definition television tuner is configured for receiving the encrypted terrestrial high definition television signal. The memory is configured for storing the encrypted digital content selections from the signal for selective purchase at the consumer media unit. The encryption and content manager is configured for receipt of a decryption key from the broadcaster via a return communication link, upon electronic payment to the broadcaster for purchase of at least one of the plurality of digital content selections, to permit access to the purchased at least one encrypted digital content selection stored in the memory of the consumer media unit.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

Components of the present invention may be implemented in hardware via a microprocessor, programmable logic, or state machine, in firmware, or in software within a given device. In one aspect, at least a portion of the software programming is web-based and written in HTML and JAVA programming languages, including links to graphical user interfaces, such as via windows-based operating system. The components may communicate via a network using a communication bus protocol. For example, the present invention may or may not use a TCP/IP protocol suite for data transport. Other programming languages and communication bus protocols suitable for use with the present invention will become apparent to those skilled in the art after reading the present application. Components of the present invention may reside in software on one or more computer-readable media. The term computer-readable media as used herein is defined to include any kind of memory, volatile or non-volatile, such as floppy disks, hard disks, CD-ROMs, flash memory, read-only memory (ROM), and random access memory (RAM).

Preferably, the user interfaces described herein run on a controller, computer, appliance or other device having an operating system which can support one or more applications. The operating system is stored in memory and executes on a processor. The operating system is preferably a multi-tasking operating system which allows simultaneous execution of multiple applications, although aspects of this invention may be implemented using a single-tasking operating system. The operating system employs a graphical user interface windowing environment which presents the applications or documents in specially delineated areas of the display screen called "windows." The operating system preferably includes a windows-based dynamic display which allows for the entry or selection of data in dynamic data field locations via an input device such as a keyboard and/or mouse. One preferred operating system is a Windows® brand operating system sold by Microsoft Corporation. However, other operating systems which provide windowing environments may be employed, such as LINUX, UNIX, as well as those available from Apple Corporation or IBM. In another embodiment, the operating system does not employ a windowing environment.

Figure 1:
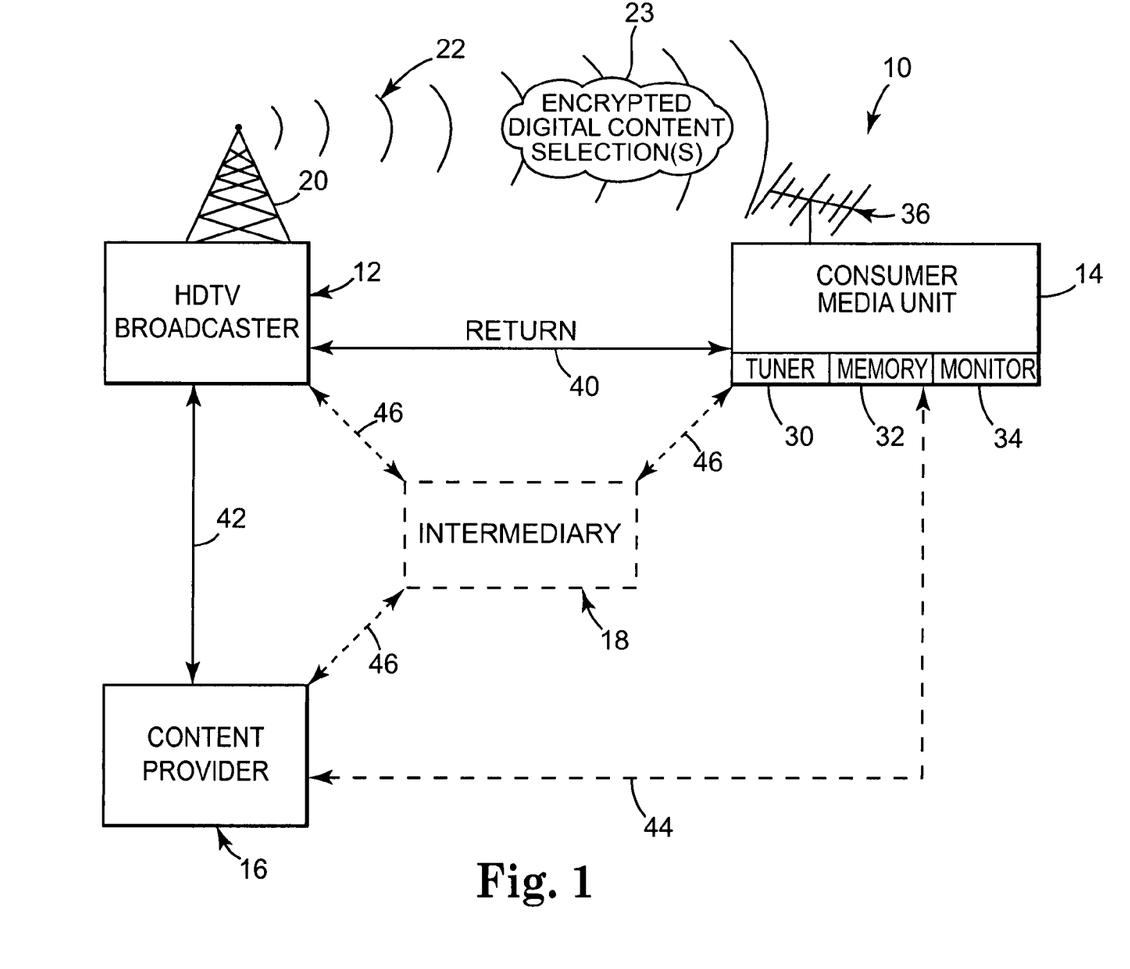
FIG. 1 is a block diagram of a digital television datacast system, according to an embodiment of the present invention.

As shown in FIG. 1, digital content distribution system 10 includes high definition television (HDTV) broadcaster 12, consumer media unit 14, content provider 16, and intermediary 18. HDTV broadcaster 12 includes transmitting antenna 20 while consumer media unit 14 includes tuner 30, memory 32, video monitor 34, and receiving antenna 36. Transmitting antenna 20 of HDTV broadcaster 12 produces a unidirectional terrestrial digital broadcast signal 22 for reception at receiving antenna 36 of consumer media unit(s) 14.

System 10 further comprises a bi-directional return communication link 40 between HDTV broadcaster 12 and consumer media unit 14, a bi-directional communication link 42 between HDTV broadcaster 12 and content provider 16, as well as an optional bidirectional communication link 44 between content provider 16 and consumer media unit 14. Optional bidirectional communication links 46 also are provided between intermediary 18 and any one of HDTV broadcaster 12, content provider 16, and consumer media unit 14.

HDTV broadcaster 12 transmits a terrestrial digital broadcast signal 22 of digital content, including a plurality of digital content selections 23, which is received at the receiving antenna 36 of consumer media unit 14. Digital content selections 23 comprise one or more of video media, audio media, and print media, such as media available from content server 74 of broadcaster 12 (later shown in FIG. 2). This signal 22 is then processed by HDTV tuner 30, stored in memory 32, and the digital content selections 23 are accessed with authorization for display on video monitor 34. Consumer media unit 14 is a HDTV television receiver equipped with an HDTV tuner 30 and video monitor 34, and which may optionally incorporate memory 32. Alternatively, consumer media unit 14 comprises HDTV tuner 30 and memory 32 being provided by a set top box, such as a personal video recorder, for use with a conventional analog television or HDTV television receiver acting as video monitor 34. Memory 32 preferably comprises a high capacity storage system, such as a computer hard drive.

Content provider 16 is a media or print company which provides digital content in the form of individual digital content selections 23 such as movies or television (video media), music (audio media), and newspapers as well as other printed publications (print media). Intermediary 18 is optionally part of system 10 and is capable of acting in contractual relationships with one or more of HDTV broadcaster 12, content provider 16, and consumer media unit 14 to facilitate the broadcast, sale, and access to encrypted HDTV digital content selections 23. Intermediary 18 optionally can provide security, payment services, content guides, etc. In particular, intermediary 18 is adapted for facilitating the purchase by consumer media unit 14 of digital content selections 23 provided by content provider 16 that are broadcast by HDTV broadcaster 12. Digital content selections can be transmitted directly from content provider 16 to HDTV broadcaster 12, or alternatively transmitted from content provider 16 to intermediary 18 for later transmission to HDTV broadcaster 12. HDTV broadcaster 12 also optionally can produce and provide its own digital content selections 23 for transmission to consumer media unit 14.

In a method according to an embodiment of the present invention, on a repeating basis HDTV broadcaster 12 periodically (e.g., daily, weekly, etc) transmits a multicast signal 22 (e.g., simultaneously broadcast multiple digital signals, such as multiplex channels) carrying encrypted digital content selections 23, such as a plurality of movies, which are received at consumer media unit 14 and stored in memory 32. Each multiplex channel carries a separate digital content selection 23, so that a multiplex HDTV broadcast can simultaneously transmit several different movies to consumer media unit 14. Since these digital content selections 23 are intended for time-delayed consumption sometime after the actual broadcast, the multicast signal 22 is preferably transmitted periodically (e.g., daily, weekly, etc.) during non-peak programming hours (e.g., 12 a.m. to 6 a.m.), which coincide with greater availability for multicasting.

A consumer then uses consumer media unit 14 to determine which broadcasted content is stored in its memory 32 and initiates a rental or purchase (or ongoing subscription) of one or more of the encrypted digital content selections 23 (stored in memory 32 at consumer media unit 14) through communication with at least one of HDTV broadcaster 12, content provider 16, and intermediary 18 via links 40, 42, 44 and 46. With this rental and/or purchase of a digital content selection 23, the consumer obtains a decryption key from HDTV broadcaster 12, content provider 16, and/or intermediary 18 via links 40-46 and applies the decryption key to the stored, encrypted digital content selection 23 to access that selection at consumer media unit 14. While consumer media unit 14 is granted temporary access to the selected digital content selection 23 via its unique decryption key, this digital content selection 23 remains generally encrypted to prevent further unauthorized viewing and copying of the stored content. System 10, including consumer media unit 14, content provider 16, HDTV broadcaster 12 and intermediary 18, is further described and illustrated in association with FIG. 2.

Figure 2:
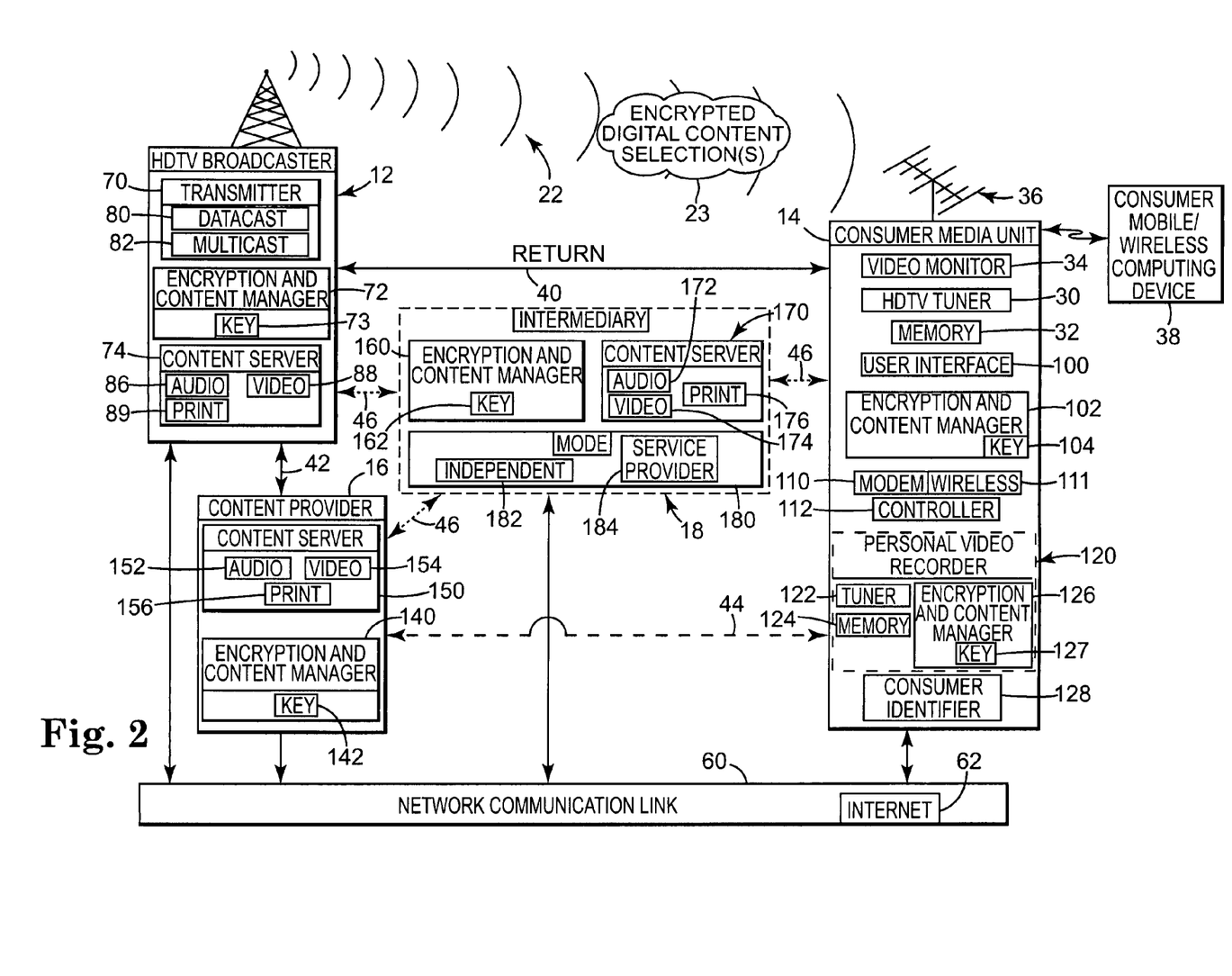
FIG. 2 is block diagram of a digital television datacast system, according to an embodiment of the present invention.

As shown in FIG. 2, in addition to HDTV broadcaster 12, consumer media unit 14, content provider 16, and intermediary 18, system 10 further comprises consumer mobile computing device 38 and network communication link 60.

Network communication link 60, as used herein, includes an Internet communication link, an intranet communication link, or similar high-speed communication link, each of which enable wired and/or wireless communication. In one preferred embodiment, network communication link 60 includes Internet communication link 62.

Consumer mobile computing device 38 optionally forms a portion of system 10 and comprises a wireless phone or personal digital assistant that is capable of wired or wireless communication with consumer media unit 14, as well as with HDTV broadcaster 12, content provider 16, and/or intermediary 18. Consumer mobile computing device 38 enables a consumer to carry out informational and financial transactions with HDTV broadcaster 12, content provider 16, and/or intermediary 18, such as selecting content for purchase or rental, making payment for the rented or purchased content, and for receiving and storing a decryption key. This decryption key is stored in consumer mobile computing device 38 and later transmitted and/or applied to consumer media unit 14 for accessing encrypted digital content selection 23 stored in memory 32 of consumer media unit 14. Accordingly, a consumer need not be at consumer media unit 14 to carry out a transaction with HDTV broadcaster 12, content provider 16, and/or intermediary 18 that will later enable access of stored digital content selections at consumer media unit 14.

As further shown in FIG. 2, HDTV broadcaster 12 of system 10 further comprises transmitter 70, encryption and content manager 72 with key 73, and content server 74. Transmitter 70 includes datacast function 80 and multicast function 82. Content server 74 comprises audio content module 86, video content module 88, and print content module 89. Transmitter 70 transmits a terrestrial digital television signal 22 according to the new Digital Television Standard, and via multicast function 82, is capable of transmitting up to four or more signals (i.e. multiplexing) over a single digital broadcast signal 22. Transmitter 70 transmits digital content selections 23 from HDTV broadcaster 12 that is supplied by content server 74 by content provider 16 and/or intermediary 18. Datacast function 80 enables transmitter 70 to transmit digital content selections 23 as virtually any form of media including printed publications, such as newspapers, videos, such as movies, programs, and audio selections. Multicast function module 82 controls the number (up to four or more) and type of simultaneous signals of digital content selections 23 sent over a single digital broadcast signal 22.

Content server 74 of HDTV broadcaster 12 holds digital content selections 23 to be broadcast by transmitter 70 with audio module 86 storing audio content/media, video module

88 holding video content/media such as movies, and print module 89 storing print media such as printed publications.

As also shown in FIG. 2, each of HDTV broadcaster 12, content provider 16, intermediary 18, and consumer media unit 14 include an encryption and content manager (72, 102, 140, 160, 126, respectively) for managing encrypted digital content selections 23 between all of these entities. However, as further described later in association with FIG. 4, all of the functions of an encryption and content manager for HDTV broadcaster 12, content provider 16, intermediary 18, and consumer media unit 14 may or may not be active, depending upon the role that each of these entities play in system 10.

Encryption and content manager 72 of HDTV broadcaster 12 enables HDTV broadcaster 12 to encrypt its entire broadcast signal 22, or parts of that signal 22, to prevent unauthorized copying, viewing, and reception of the broadcasted digital content selections 23. Encryption and content manager 72 uses high level encryption schemes, such as those provided by RSA Security of Bedford, Mass., or other digital encryption technologies, such as Digital Rights Management from Microsoft Corporation. Encryption and content manager 72 facilitates applying a unique encryption/decryption key 73 to each specific digital content selection 23 in the broadcast signal 22, so that each digital content selection 23 in a multiplexed signal 22 is encrypted with its own key 73. Encryption and content manager 72 will be described further in association with FIGS. 4 and 5.

Consumer media unit 14 comprises previously identified HDTV tuner 30, memory 32, and video monitor 34. HDTV tuner 30 comprises a HDTV tuner card that is capable of receiving and processing HDTV signals for display on a HDTV television or analog television. Video monitor 34 is incorporated as part of a HDTV television, or implemented separately as an analog television.

Consumer media unit 14 of system 10 further comprises user interface 100, encryption and content manager 102 with key 104, modem 110 with optional wireless transceiver 111, controller 112, and optional personal video recorder 120 which includes tuner 122, memory 124, and key manager 126.

User interface 100 of consumer media unit 14 preferably comprises a graphical user interface including a keypad, touchscreen, remote control, and/or pointing devices for entering menu selections, managing digital content selections 23 stored in memory 32, managing account information, carrying out financial transactions, as well as a displaying data related to all of these functions of consumer media unit 14. User interface 100 is optionally implemented via video monitor 34.

Encryption and content manager 102 of consumer media unit 14, via user interface 100, allows a consumer to select and access encrypted digital content selections 23 stored in memory 32 of consumer media unit 14 from a broadcasted digital signal 22 from HDTV broadcaster 12. In particular, encryption and content manager 102 facilitates communicating with HDTV broadcaster 12, content provider 16, and/or intermediary 18 from a menu to purchase or rent an encrypted digital content selection 23, and then obtain and apply a unique decryption key 104 for accessing the encrypted digital content selection. Encryption and content manager 102 of consumer media unit 14 will be described further in association with FIGS. 4 and 5.

Modem 110 of consumer media unit 14 includes at least one of a cable modem, phone modem, distributed service line (DSL) modem or integrated service distribution network (ISDN) modem, and satellite modem. Modem 110 is preferably incorporated in consumer media unit 14 and/or implemented indirectly as a network resource, in communication with and accessible by consumer media unit 14, such as through a 10/100 bt connection. Modem 110 enables consumer media unit 14 to communicate with other entities such as HDTV broadcaster 12, content provider 16, and/or intermediary 18 for transmitting and receiving transactional data (e.g. decryption keys 73, payment data, etc) via links 40-46. Moreover, modem 110 enables consumer media unit 14 to be web-capable with Internet entities such as web sites via network communication link 60.

Modem 110 also optionally includes wireless transceiver 111 to enable wireless modem capability. Wireless transceiver 111 of consumer media unit 14, with or without modem 110, also enables wireless communication between consumer media unit 14, HDTV broadcaster 12, content provider 16 and/or intermediary 18 via network communication link 60. Wireless transceiver 111 also optionally enables short range wireless communication between consumer media unit 14 and consumer mobile computing device 38 using other known communication protocols such as Wireless Application Protocol (WAP), Bluetooth, Infrared (IrDA, FIR), 802.11, and UltraWideBand (UWB). This controller 112, in cooperation with user interface 100, supports and coordinates interaction of any one, or all, of components of consumer media unit 14. Controller 112 preferably includes hardware, software, firmware or combination of these. In one preferred embodiment, controller 112 includes a microprocessor-based system capable of performing a sequence and logic operation and including memory for storing information. Memory 32 operates in cooperation with controller 112 for storing and retrieving encrypted content at consumer media unit 14.

Personal video recorder 120 of consumer media unit 14 includes tuner 122, memory 124, and encryption and content manager 126 with key 127. Personal video recorder 120 preferably is implemented as a set-top box, such as those available from TiVO, Inc. Alviso, Calif. However, all of the components and functions of personal video recorder 120 are optionally incorporated together, and implemented along with video monitor 24, as an integrated HDTV television receiver acting as consumer media unit 14.

Personal video recorder 120 is preferably used with a television not having its own HDTV tuner 30 or memory 32, so that with the addition of personal video recorder 120, a conventional analog television can approximate the function of a digital television for receiving, storing, and accessing encrypted broadcasted digital content selections 23. Accordingly, tuner 122 and memory 124 of personal video recorder 120 preferably have substantially the same features and attributes as previously described HDTV tuner 30 and memory 32. Finally, personal video recorder 120 carries encryption and content manager 126 for managing encryption and decryption keys and has substantial the same features and attributes of encryption and content manager 102 of consumer media unit 14.

Consumer media unit 14 also comprises a consumer identifier 128 for uniquely identifying consumer media unit 14 during communications and transactions with HDTV broadcaster 12, content provider 16, and/or intermediary 18. Consumer identifier 128 preferably is incorporated into tuner 30 as an alphanumeric string or other symbolic representation, and is optionally stored on a memory card in tuner 30. Consumer identifier 128 is optionally used by intermediary 18, content provider 16, and/or HDTV provider 12 in communication queries with consumer media unit 14 to obtain and verify the identity of consumer media unit 14, and to uniquely identify purchased digital content selections 23.

As shown in FIG. 2, content provider 16 of system 10 comprises encryption and content manager 140 with key 142, as well as content server 150 with audio content module 152, video content module 154 and print content module 156. Content server 150 stores a collection of audio media content, video media content, and print media content, respectively in audio, video, and print modules 152, 154, and 156 for transmission to HDTV broadcaster 12 and/or intermediary 18 for broadcast by HDTV broadcaster 12.

Encryption and content manager 140 of content provider 16 has substantially the same features and attributes of encryption manager 72 of HDTV broadcaster 12. Encryption and content manager 140 allows assigning at least one encryption/decryption key 142 for each encrypted digital content selection 23 sent to HDTV broadcaster 12, with each consumer media unit 14 being provided with a unique decryption key 142 for each encrypted digital content selection 23 to be accessed.

Intermediary 18 optionally forms a portion of system 10 and comprises encryption and content manager 160 with key 162, as well as content server 170 with audio content module 172, video content module 174 and print content module 176. Intermediary 18 also comprises mode function 180 which includes two modes: independent 182 and service provider 184. In service provider mode 184, intermediary 18 is configured for relieving HDTV broadcaster 12 and/or content provider 16 of providing certain aspects of distributing and managing content for broadcast. In particular, intermediary 18 acts as a service provider to content provider 16 by operating its own content server 170 to administer content to HDTV broadcaster 12 while administering requests for access to encrypted digital content selections by consumer media unit 14. This relationship includes intermediary 18 managing the assignment, transmission, and tracking of decryption keys for each digital content selection purchased by consumer media unit 14 directly, or indirectly through consumer mobile computing device 38. In this arrangement, intermediary 18 acts as an agent for content provider 16 to save content provider 16 from having to manage direct retail contact with either consumer media unit 14 and/or HDTV broadcaster 12.

Likewise, intermediary 18 optionally acts as a service provider to HDTV broadcaster 12 by operating its own encryption and content manager 160, allowing HDTV broadcaster 12 to limit its involvement to merely transmitting what is supplied and scheduled by intermediary 18. In addition, when content provider 16 is not present, intermediary 18 supplies content to HDTV broadcaster 12 and/or manages content from HDTV broadcaster 12 on behalf of HDTV broadcaster 12.

In independent mode 182, intermediary 18 can rent broadcast time from HDTV broadcaster 12 and supply HDTV broadcaster 12 with digital content selections 23 for broadcast that is purchased from content provider 16 or produced by intermediary 18. For example, intermediary 18 can purchase a set of broadcast time of a multiplexed signal 22 from HDTV broadcaster 12, such as from midnight to 6 a.m., and then set a schedule of what will be broadcast during that period, as well as supply HDTV broadcaster 12 the content to be broadcast. With these instructions, HDTV broadcaster 12 only need transmit an encrypted terrestrial digital broadcast signal 22 at a time, place, and manner agreed to by intermediary 18 and HDTV broadcaster 12. In independent mode, intermediary 18 controls all aspects of distribution and management of the broadcasted content (including managing encryption schemes, retail sales of the content, and managing decryption key assignment to each consumer media unit 14), except for the actual broadcast of the digital content selections.

Figure 3:
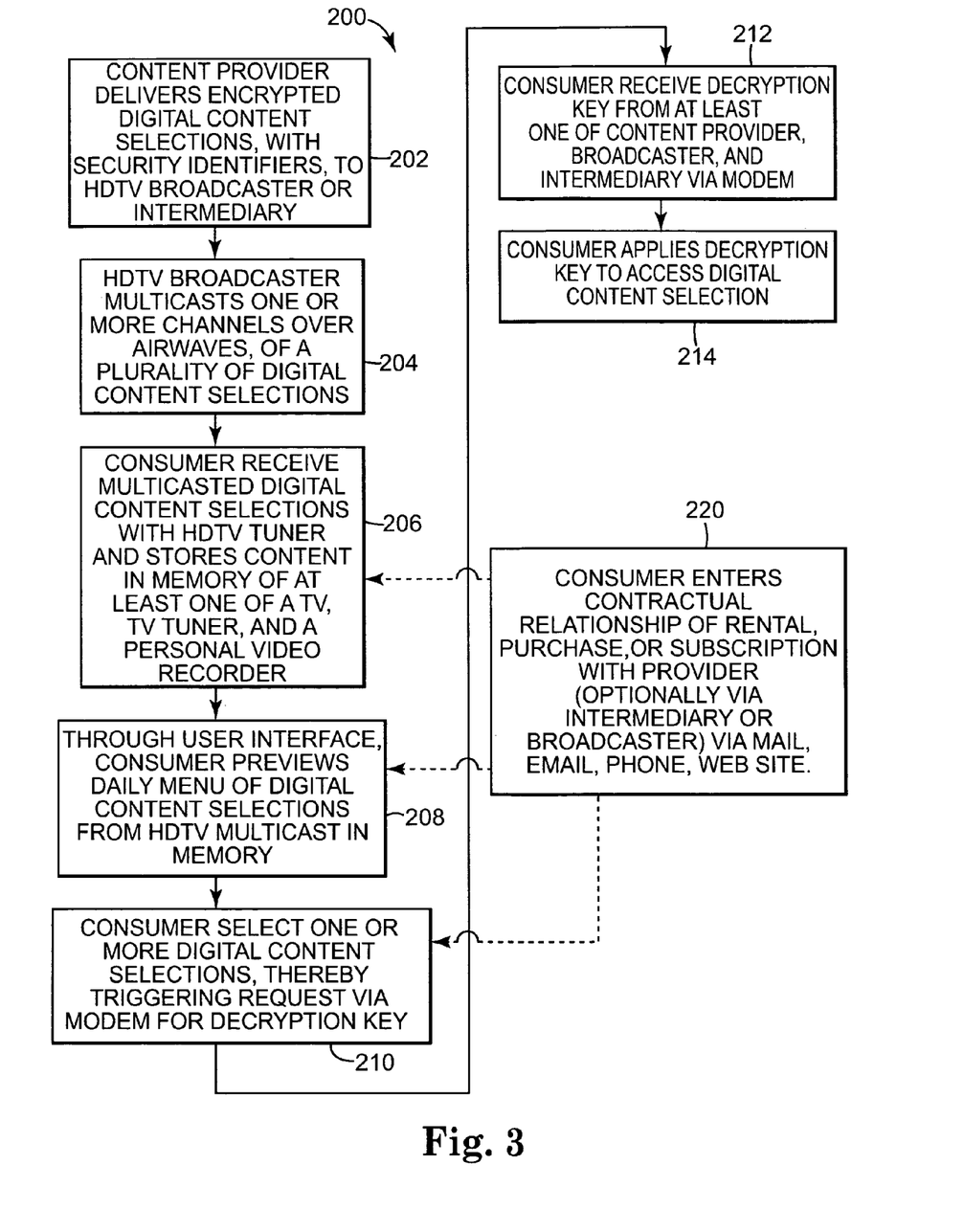
FIG. 3 is a flow diagram of a method of digital television datacasting, according to an embodiment of the present invention.

FIG. 3 illustrates method 200 of the present invention for High Definition Television datacasting. As shown in box 202 of FIG. 3, method 200 comprises content provider 16 delivering digital content to HDTV broadcaster 12 including any accompanying encryption information that is transmitted from encryption and content manager 140 of content provider 16 to encryption and content manager 72 of HDTV broadcaster 12. Next, as shown in box 204, HDTV broadcaster 12 periodically (e.g., daily, weekly, etc.) datacasts one or more signals of digital content selections 23 (via multiplexing, and preferably at non-peak hours) over a terrestrial broadcast HDTV digital signal 22. This datacast preferably includes a plurality of digital content selections 23 including any one or all of the formats taken from audio content module 86 (e.g., music singles, compilations, etc.), video content module 88, and print content module 89. For example, digital content selections 23 such as video content optionally includes new release movies as well as previously released movies.

As shown in box 206, the consumer receives the encrypted digital content selections 23 at consumer media unit 14 via HDTV tuner 30 and stores digital content selections 23 in memory 32. During this storage, any previously stored digital content selections 23 from previous multicasts (e.g. from prior periodic multicast) is optionally deleted or overwritten with the most recently multicasted digital content selections 23 (e.g. current periodic multicast).

As previously described, memory 32 is incorporated in at least one of a television, HDTV tuner 30, and memory 124 of optional personal via recorder 120 (e.g., set top box). As shown in box 208, the consumer then uses user interface 100 and consumer media unit 14 to preview a periodic (e.g., daily, weekly) menu of digital content selections 23 from the HDTV multicast that is stored in memory 32. The consumer then selects one or more digital content selections 23 from the menu of user interface 100 which triggers a request from consumer media unit 14 to HDTV broadcaster 12 via return communication link 40 (or to content provider 16 via link 44 or to intermediary 18 via links 46) to obtain a decryption key for the selected digital content selection 23. The consumer receives a decryption key (e.g., key 104) at consumer media unit 14 from HDTV broadcaster 12 (or content provider 16, or intermediary 18) via modem 110. With user interface 100, the consumer applies decryption key 104 to access encrypted digital content selection 23 in memory 32 for viewing on video monitor 34 via HDTV tuner 30.

As further shown in box 220, the consumer optionally obtains decryption key 104 through a payment transaction or contractual relationship, such as rental, purchase, or subscription with content provider 16 (optionally with intermediary 18 or with HDTV broadcaster 12) via modem 110, or alternatively via electronic mail, etc., and enters the decryption key 104 into the tuner to authorize viewing of digital content selection 23.

Any digital content selection 23 is optionally purchased for unlimited use and then is preserved through marking in memory 32 so that it is not overwritten (i.e. deleted) with subsequently multicasted digital content selections 23, or it is archived to a removable recordable medium (e.g. DVD, videotape).

Figure 4:
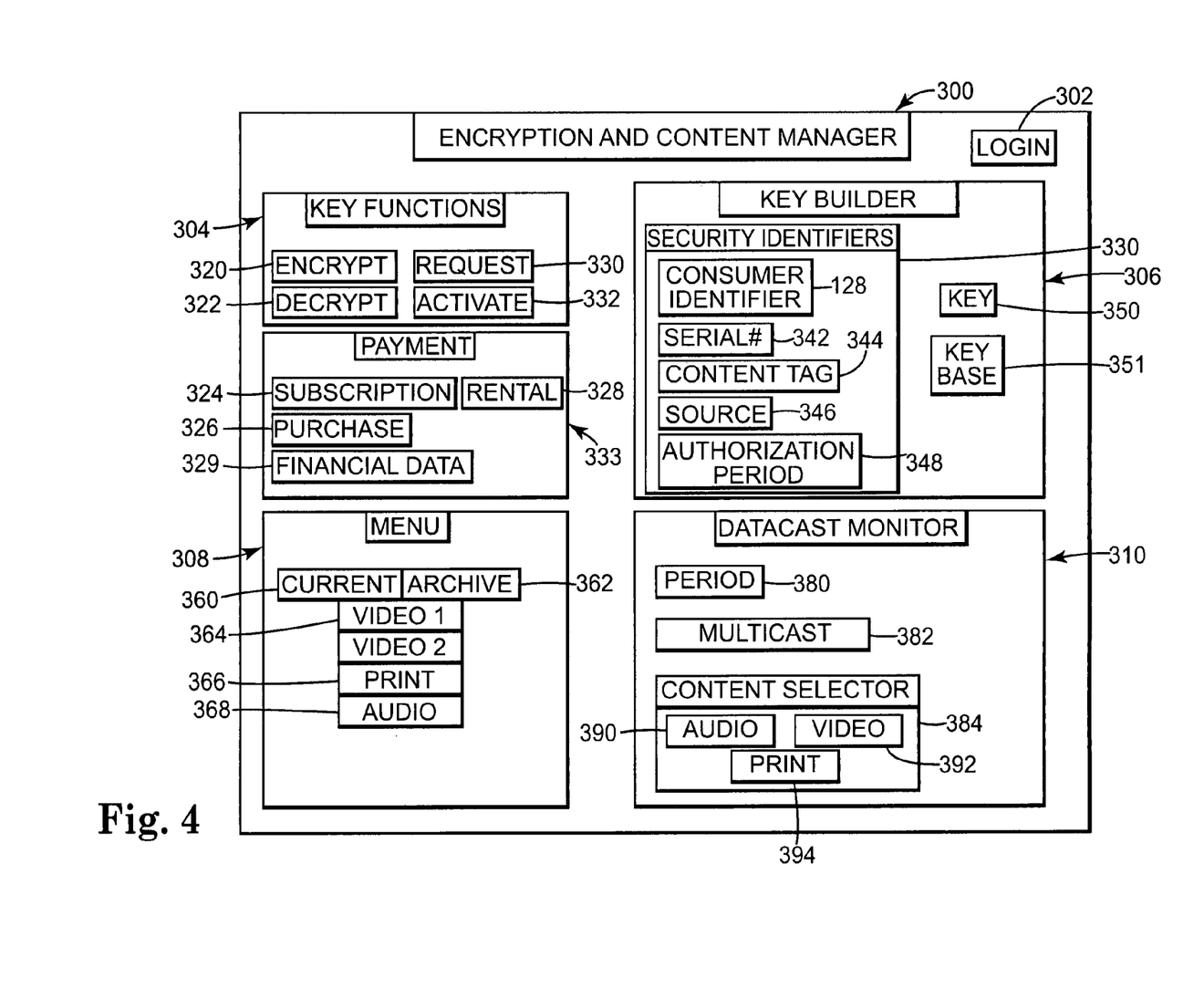
FIG. 4 is a block diagram of an encryption and content manager, according to an embodiment of the present invention.

FIG. 4 illustrates encryption and content manager 300. Encryption and content manager 300 depicts all possible functions and features of the various encryption and content managers of system 10, including encryption and content managers 72, 102, 126 140, and 160. When each of these encryption and content managers 72, 102, 126, 140, and 160 are employed in each of their respective capacities (in HDTV broadcaster 12, content provider 16, intermediary 18 and consumer media unit 14), some or all of the functions and features of encryption and content manager 300 may be employed as desired. Encryption and content manager 300 (as employed in each respective component of system 10) is accessible through user interface 100 for consumer media unit 14 and through appropriate management interfaces of content provider 16, HDTV broadcaster 12, and intermediary 18. Finally, while each encryption and content manager 72, 102, 140, 126, 160 each designate a differently numbered key (e.g., 73, 104, 127, 142, and 162), it is understood that each encrypted digital content is associated with a unique encryption/decryption key and that different reference numerals 73, 104, 127, 142, 162 for a key represent that each manager controls one or more encryption/decryption keys.

As shown in FIG. 4, encryption and content manager 300 includes a login function 302, key functions 304, key builder 306, menu 308, datacast monitor 310, and payment monitor 333.

Key functions 304 comprise encryption function 320, decryption function 322, request function 330, and activation function 332. Key functions 304 is primarily employed by HDTV broadcaster 12, content provider 16, and intermediary 18, and is implemented in each of encryption and content managers 72, 102, 126, 140, and 160 of each of those respective devices. Encryption function 320 controls applying encryption to any format of digital content to create encrypted digital content selections 23 while decryption function 322, in cooperation with encryption function 320, produces decryption keys for use by consumers at consumer media unit 14 upon purchase or rental of digital content selections 23 from HDTV broadcaster 12, content provider 16, and/or intermediary 18.

Key builder 306 is primarily employed by HDTV broadcaster 12, content provider 16, and intermediary 18, and is implemented in each of encryption and content managers 72, 140, and 160 of each of those respective devices. Key builder 306 controls specifying the attributes of an encryption key and/or decryption key and is provided for implementing encryption and decryption functions 320, 324 of key functions 304. Key builder 306 includes multiple security identifiers 330, all of which may be optionally selected by HDTV broadcaster 12, content provider 16, and/or intermediary 18 to form key 350. These security identifiers 330 include key base 351, consumer identifier 128, serial number 342, content tag 344, source identifier 346, and authorization period 348.

Key 350 represents any one of keys 73, 104, 127, 142, 162 used by respective encryption and content managers 72, 102, 126, 140, and 160. Key base 351 is a baseline encryption/decryption scheme (such as a 128 bit encryption/decryption key) and is configured for custom modification by security identifiers 330 of key builder 306. Consumer identifier 128 of key builder 306 is an alphanumeric string or other symbolic representation that uniquely identifies one or more consumers and/or consumer media units 14 for uniquely associating a consumer or consumer media unit 14 to a specific digital content in relation to purchase or rent of the digital content selection 23. Serial number 342 specifies a serial number for each broadcast signal 22 so that each digital content signal is uniquely identified for tracking authorized and unauthorized use and copying of each digital content selection 23. Content tag 344 is a symbolic representation that is applied to a digital content selection 23 for being embedded in the digital content to be inseparable from the digital content selection 23 so that the digital content selection, whether copied or not, is uniquely identifiable. Source identifier 346 specifies the source, such as any one of intermediary 18, content provider 16, and HDTV broadcaster 12, from which the digital content selection 23 is obtained or provided. Authorization period 348 is attached to a digital content selection 23 and specifies a period of time in which the digital content selection 23 can be accessed by consumer media unit 14. For example, authorization period 348 can specify that a digital content selection such as a movie (e.g., audio/video digital content) is accessible only from 12 am to 12 pm on Dec. 6, 2002.

Menu 308 of encryption and content manager 300 is optionally employed by HDTV broadcaster 12, content provider 16, intermediary 18, and consumer media unit 14, and is implemented in each of encryption and content managers 72, 102, 126, 140, and 160 of each of those respective devices.

Menu 308 comprises current selections 360 and archive selections 362. Activation of current selections function 360 causes display of, and represents, all digital content stored in memory 32 from the most recent multicast received at consumer media unit 14. Archive selections 362 causes display of, and represents, all digital content selections 23 stored in memory 32 from previous multicasts received at consumer media unit 14 that have been purchased for unlimited access (or are under subscription for unlimited access). Both current selections 360 and archive selections 362 permit selecting different formats of digital content including video content selections 364, print content selections 366, and audio content selections 368.

In use, menu 308 is used by consumer via user interface 100 with request function 330 of key functions 304 by highlighting the desired content to be selected from menu, which automatically triggers request function 330 of encryption and content manager of HDTV broadcaster 12, content provider 16, and/or intermediary 18 to process a request from consumer media unit 14 for a decryption key to access the corresponding digital content selection 23 from memory 32.

Selecting an archive selection with an unexpired decryption key will result in immediate access to the digital content selection 23 at consumer media unit 14. Selecting a current digital content selection 23 will trigger a request to content provider 16, HDTV broadcaster 12, and intermediary 18 for rent or purchase of the digital content selection 23 and issuance of a decryption key to consumer media unit 14 via decrypt function 322 and activate function 332 of key functions 304 from encryption and content managers 72, 102, 126, 140, and 160.

Payment monitor 333 regulates financial communications between consumer media unit 14, HDTV broadcaster 12, content provider 16, intermediary 18, and consumer mobile computing device 38. Payment monitor 333 includes subscription function 324, purchase function 326, rental function 328, and financial data 329. Purchase and rental function 326, 328 include activation or triggering of communication from consumer media unit 14 (optionally via consumer mobile computing device 38) with broadcaster 12, content provider 16, and/or intermediary 18 to carry out transactions necessary to complete rental or purchase of stored digital content selections. This communication includes exchange of consumer identifier 128 and financial data 329 (e.g., credit card number, name, address, etc.). Subscription function 324 operates similarly except that a subscription results in unlimited access and ongoing decryption to a single or multiple archived digital content selections and/or to on-going access to current digital content selections 23 in memory 32.

Datacast monitor 310 of encryption and content manager 300 comprises period function 380, multicast function 382, and content selector 384 with audio content module 390, video content module 392, and print content module 394. Datacast monitor 310 is used by HDTV broadcaster 12, content provider 16, and intermediary 18 to regulate multicasts of digital content selections 23 to be stored in memory 32 of consumer media unit 14.

When employed by HDTV broadcaster 12, period function 380 and multicast function 382 cooperate with datacast and multicast functions 80, 82 of transmitter 70 of HDTV broadcaster 12. In addition, when employed by HDTV broadcaster 12, content selector 384 cooperates with content server 74 of HDTV broadcaster 12.

Period function 380 of datacast monitor 310 regulates how often a digital content will be broadcast (e.g., daily, weekly), as well as the time of day of the broadcast (e.g., 3 a.m.). Multicast type 382 controls the number of digital signals of a single HDTV channel are broadcasted as multiplexed signals (up to 4 or more), thereby controlling the resolution of each signal as well as the volume of content being broadcasted. Content selector 384 facilitates selection of any one of, or all of, audio, video, and print media from audio component 390, video component 392, and print component 394 for datacast in multicast signal 22 (FIG. 1) to consumer media unit(s) 14.

Figure 5:
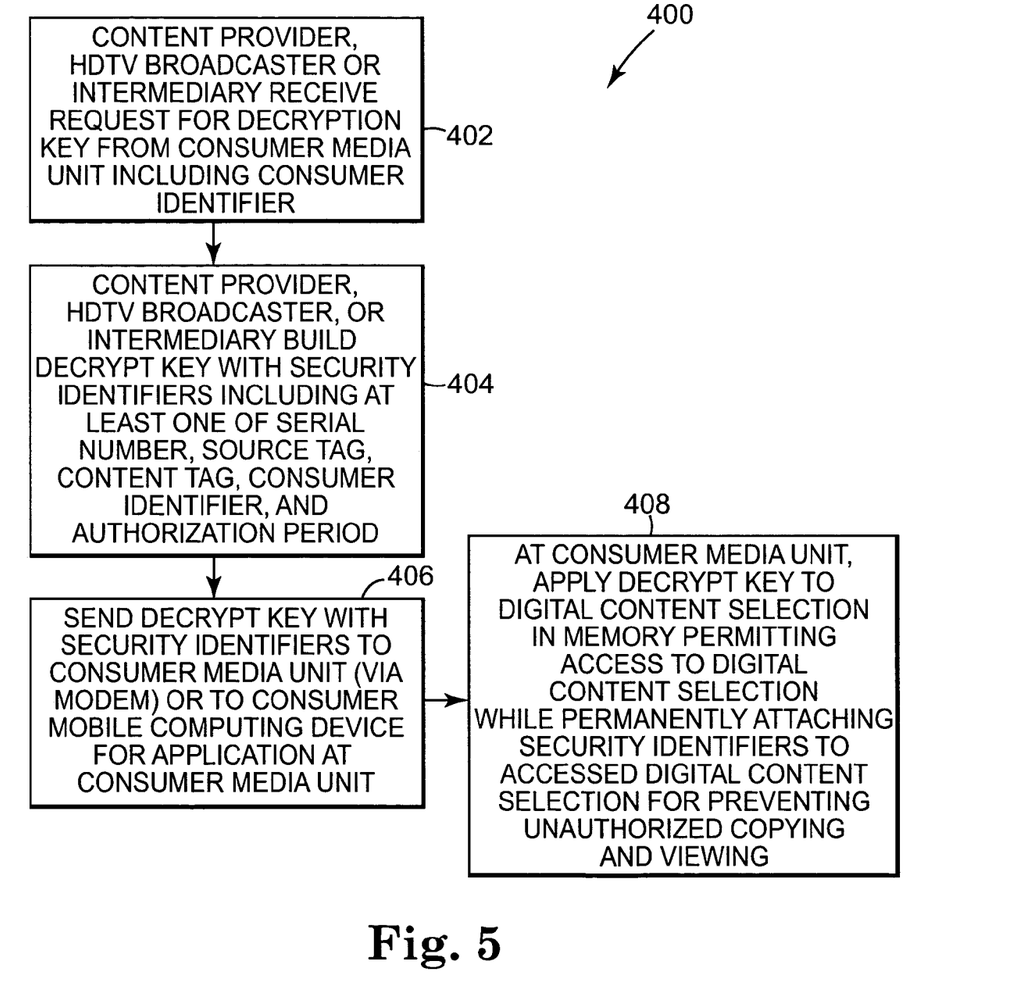
FIG. 5 is a flow diagram of a method of managing a decryption key for accessing encrypted HDTV content.

As shown in FIG. 5, method 400 according to an embodiment of the present invention is directed to specifying and supplying a decryption key to a consumer media unit 14 for accessing encrypted digital content selections 23 stored in memory 32. As shown in box 402, method 400 includes one or more of content provider 16, HDTV broadcaster 12, and intermediary 18 receiving a request from consumer media unit 14 for a decryption key via modem for a digital content selection 23. This request includes consumer identifier 128 (FIG. 2) that uniquely identifies consumer media unit 14 to distinguish a valid request from bogus requesters and third parties. As shown in box 404, one or more of content provider 16, HDTV broadcaster 12, and intermediary 18 build decryption key 350 (73, 142 in FIG. 2) using key builder 306 with security identifiers 330 including at least one of consumer identifier 128, serial number 342, content tag 344, source tag 346, authorization period 348, and key base 351.

Next, as shown in box 406, one or more of content provider 16, HDTV broadcaster 12, and intermediary 18 sends decryption key 73, 142 or 162 to consumer media unit 14 (via modem 110) or an optional consumer mobile computing device 38 (e.g., wireless phone, personal digital assistant, notebook computer, etc.) for application at consumer media unit 14. At consumer media unit 14, as shown in box 408, decryption key 73, 142, or 162 is received by encryption and content manager 102 via HDTV tuner 30 and applied as key 104 and/or 127 to selected encrypted digital content selections 23 in memory 32 thereby permitting access to the selected digital content selections 23 while permanently attaching security identifiers 330 to the accessed digital content selection 23. Security identifiers 330 will prevent and/or track unauthorized copying and viewing of accessed content by entities other than consumer media unit 14, as well as for tracking any unauthorized use, copying, and viewing of the accessed digital content selection 23 by consumer media unit 14.

Figure 6:
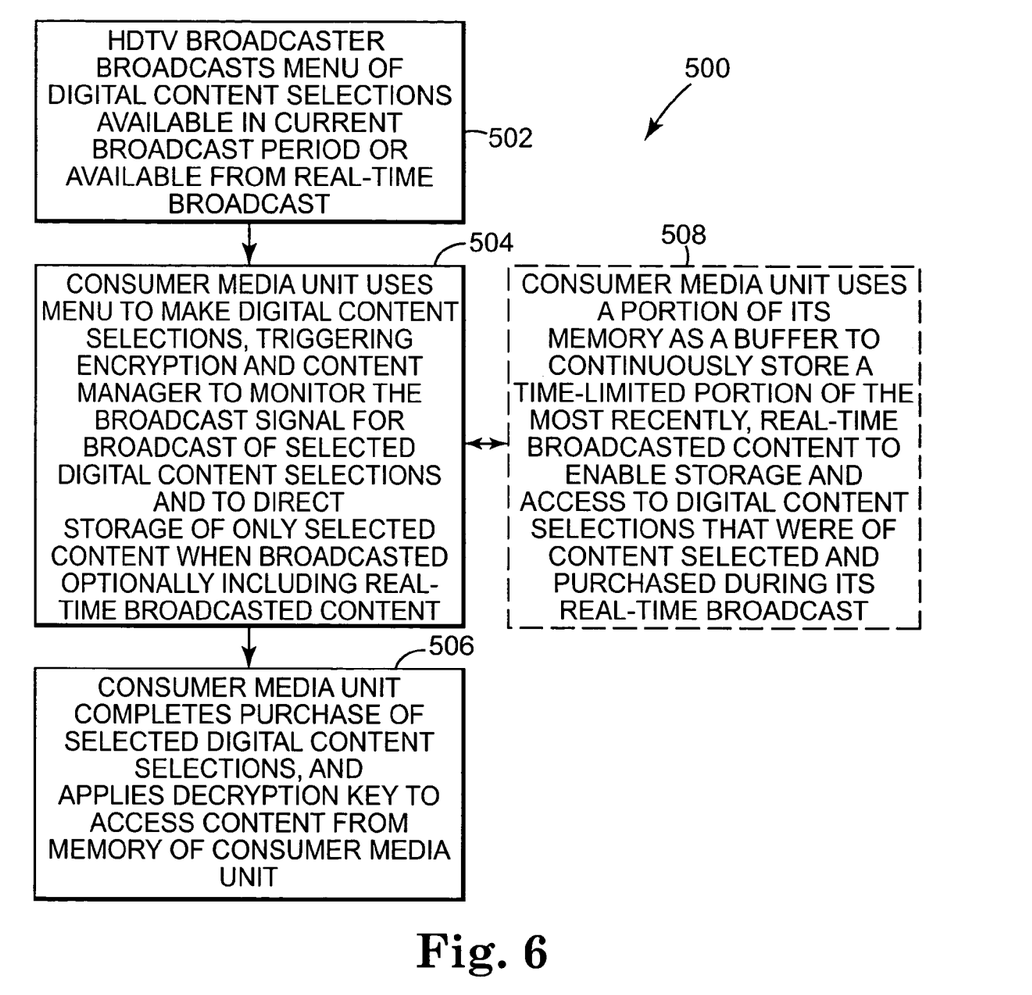
FIG. 6 is a flow diagram of a method of digital television datacasting, according to an embodiment of the present invention.

As shown in FIG. 6, method 500 for digital television multicasting, according to an embodiment of the present invention, enables consumer media unit 14 to store in its memory 32 only selected and purchased content from an encrypted broadcast-for-purchase signal 22, rather than automatically storing all content from an encrypted broadcast-for-purchase signal 22 (as previously described and illustrated in association with FIGS. 1-5). In method 500, as shown in box 502 of FIG. 6, in addition to periodically multicasting a terrestrial digital broadcast signal 22 of encrypted digital content selections 23, HDTV broadcaster 12 repeatedly broadcasts menu 308 (see FIG. 4). Menu 308 is generated by any one of content provider 16, intermediary 18, or HDTV broadcaster 12 and includes content currently being broadcast in real time from HDTV broadcaster 12, or to be broadcast from HDTV broadcaster 12 in the current period (e.g., within 6, 12, or 24 hours), and that is available for rent or purchase. In method 500, menu 308 of encryption and content manager 300 (see FIG. 4) includes current selections 360 of digital content selections 23 to be broadcast throughout a current broadcast period (e.g. three hour period, twelve hour period, etc., as set by period function 380) and/or includes current selections 360 of what is currently being broadcast by HDTV broadcaster 12 to consumer media unit 14 in real time. Menu 308 and the broadcast signal 22 are received by consumer media unit 14 in a manner substantially the same as previously described in association with FIGS. 1-5.

As shown in box 504, in method 500 a consumer uses consumer media unit 14 (or consumer mobile computing device 38) to make a selection of digital content selections 23 from menu 308 (including use of purchase function 326 or rental 328 function), and upon this selection, encryption and content manager 102 in consumer media unit 14 monitors the broadcasted signal 22 via tuner 30. Once the selected digital content selection 23 is being broadcast, encryption and content manager 102 activates storage of the broadcasted content in memory 32. HDTV tuner 30 and encryption and content manager 300 recognize which selected digital content selection 23 is to be stored by monitoring the time of broadcast or by optionally monitoring unencrypted header info (such as subject, title, date, etc.) of broadcasted encrypted digital content selections 23 that continuously accompanies the broadcast signal 22. Recognition of the selected content by encryption and content manager 102 (via tuner 30) triggers storage of the selected digital content selection 23 in memory 32 of consumer media unit 14 (or memory of consumer mobile computing device 38).

As shown in box 506, the consumer completes purchase or rental of the digital content selection 23 and then applies decryption key 104 or 127 to access the digital content selection 23 from memory 32 of consumer media unit 14 immediately, or at a later time. The purchase or rental may be made at the time of the selection, or at a later time such as at a period of time delayed from a time of the broadcast. In addition, purchase or rental optionally is made simultaneously with the selection of digital content selection 23 for storage into memory 32. Decryption key 104 or 127 is obtained through communication between consumer media unit 14 and any one or more of content provider 16, HDTV broadcaster 12, and intermediary 18.

As shown in box 508, in method 500 HDTV tuner 30 and/or content and encryption manager 102 optionally uses a portion of memory 32 of consumer media unit 14 or a portion of memory 124 of personal video recorder 120 (or memory of consumer mobile computing device 38) as a buffer for continuously storing a recent time-limited portion of the real time broadcast signal 22 (e.g., the most recent 15 minutes or 30 minutes of the broadcast signal from HDTV broadcaster 12). This stored portion of the most recently broadcast content is used in the event that a consumer selects for purchasing a current selection 360 of digital content selections 23 from menu 308 (of content that is currently being broadcast in real time) and a portion of the digital content selection 23 has already been broadcast (at the time the request for purchase is made). Accordingly, upon requesting purchase of the digital content selection 23, encryption and content manager 102 of consumer media unit 14 directs storage into memory 32 (or memory 124) of the selected content from the on-going real time broadcast as it is being broadcast from the time of selection until completion of the broadcast of the selected digital content selection 23. Encryption and content manager 102 (or encryption and content manager 126) then also retrieves from the buffer portion of memory 32 (or memory 124) the already stored time-limited portion of the broadcasted digital content selection 23. The content retrieved from the buffer portion of memory 32 (or memory 124) is merged with and stored with the remainder of the digital content selection 23 after it is received from the on-going broadcast to form a complete digital content selection 23 in memory 32 (or memory 124). In this way, a consumer can identify and store into memory 32 of consumer media unit 14 (or memory 124 of personal video recorder 120) a digital content selection 23 from a real-time broadcast signal 22, and then purchase the stored encrypted digital content selection 23.

After merging of the time-limited portion of the digital content selection 23 and the remainder of the digital content selection 23 into a complete digital content selection 23 into memory 32 (or memory 124), the consumer then completes the purchase of the digital content selection 23 and application of decryption key 104, 127 to consume the digital content selection 23 from memory 32 (or memory 124).

In method 500, the mechanics of a consumer request to purchase or rent encrypted digital content selection 23 that is stored in memory 32 of consumer media unit 14 (or memory 124 of personal video recorder 120) is handled substantially the same way as previously described in association with FIGS. 1-5, including: the manner of decrypting encrypted digital content selections 23; the manner of handling of the financial aspects of a content purchase; and the manner and timing of communicating between consumer media unit 14 and any one or more of content provider 16, intermediary 18, and HDTV broadcaster 12 during such a purchase.

Embodiments of the present invention for multicasting High Definition Television signals permits time delay consumption of digital content selections by allowing storage of encrypted broadcast digital content selections at a consumer media unit and subsequent purchase and access to the stored content with a decryption key obtained from at least one of a broadcaster, content provider, and an intermediary.

While specific embodiments have been illustrated and described, herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A digital content distribution system comprising:
   a high definition television broadcaster comprising a high definition television transmitter configured for multicasting, on a repeating periodic basis, an encrypted terrestrial high definition television signal that includes a plurality of different encrypted digital content selections for purchase, wherein the multicasted signal comprises a multiplexed array of signal portions that are broadcast simultaneously and in which each respective signal portion of the multiplexed array carries just one of the respective different encrypted content selections; and
   a consumer media unit comprising:
      a high definition television tuner configured for receiving the encrypted terrestrial high definition television signal;
      a memory configured for storing the different encrypted digital content selections from the signal for selective purchase at the consumer media unit; and
      an encryption and content manager configured for receipt of a decryption key from the broadcaster via a return communication link, upon electronic payment to the broadcaster for purchase of at least one of the plurality of different encrypted digital content selections, to permit access to the purchased at least one encrypted digital content selection stored in the memory of the consumer media unit.

2. The system of claim 1 comprising:
   an intermediary configured to communicate with the consumer media unit in substitute for the broadcaster via the return communication link between the consumer media unit and the intermediary, and configured to receive payment from the consumer media unit for purchase of the at least one encrypted digital content selection, to receive the request from the consumer media unit for the decryption key, and to issue the decryption key to the consumer media unit.

3. A consumer media unit comprising:
   a high definition digital television tuner configured to receive a terrestrial high definition television signal that includes a plurality of different digital content selections multicasted on a repeating periodic basis, the plurality of different digital content selections including at least one encrypted digital content selection for purchase, wherein the multicasted signal comprises a multiplexed array of signal portions that are broadcast simultaneously and in which each respective signal portion of the multiplexed array carries just one of the respective different encrypted content selections;
   a memory configured for storing the at least one encrypted digital content selection for purchase at the consumer media unit; and
   an encryption and content manager configured for requesting and obtaining from at least one of the broadcaster, an intermediary, and a content provider, through a purchase transaction, a decryption key for accessing the at least one encrypted digital content selection stored in the memory of the consumer media unit.

4. The consumer media unit of claim 3 and further comprising:
   a video monitor configured for viewing the at least one encrypted digital content selection.

5. The consumer media unit of claim 3 and incorporated as a portion of a digital content distribution system, the system further comprising:
   a high definition television broadcaster including a transmitter configured for multicasting the terrestrial high definition television signal; and
   a return communication link configured for carrying communications between the consumer media unit and the broadcaster, the communications including a payment transaction to purchase access to the at least one encrypted digital content selection stored in the memory of the consumer media unit, a request for a decryption key from the consumer media unit to the broadcaster, and a transmission of the decryption key from the broadcaster to the consumer media unit.

6. The system of claim 5 wherein the high definition television broadcaster comprises:
an encryption and content manager comprising a key builder configured for specifying a plurality of security identifiers for encryption of the at least one encrypted digital content selection and for operation of a corresponding decryption key with the plurality of security identifiers including at least one of a consumer identifier, a broadcast serial number, a content tag, a source tag, and an authorization period and the key builder configured for attaching at least one of the plurality of security identifiers to the at least one digital content selection.

7. The system of claim 6 wherein the encryption and content manager of the broadcaster further comprises:
a content server comprising a print media module, an audio media module, and a video module media, and configured for providing the at least one encrypted digital content selection from at least one of the print media module, the audio media module, and the video media module.

8. The system of claim 5 and further comprising:
an intermediary configured to act in substitution for the broadcaster, via the return communication link, to receive the payment transaction from the consumer media unit, to receive the request from the consumer media unit for the decryption key, and to transmit the decryption key to the consumer media unit.

9. The system of claim 5 and further comprising:
a content provider in communication with the broadcaster and configured to provide the broadcaster with the plurality of different encrypted digital content selections and configured to act in substitution for the broadcaster to receive the request from the consumer media unit for the decryption key and to produce and transmit the decryption key to the consumer media unit.

10. A digital multicast system comprising:
means for terrestrially broadcasting an encrypted digital television signal, via multiplexing the signal into an array of simultaneously broadcasted signal portions, on a repeating periodic schedule to transmit a first plurality of different digital content selections for purchase including at least one of a movie, a music compilation, and a printed publication, wherein each different signal portion carries just one of the different digital content selections;
means for receiving the encrypted digital television signal, and with each repetition of the repeating periodic schedule, storing the first plurality of different digital content selections in substitution of a second plurality of digital content selections previously stored from a prior multicasted encrypted digital television signal; and
means for purchasing by rent, ownership, or subscription at least one of the stored first plurality of digital content selections and for receiving a decryption key for accessing one or more of the stored first plurality of digital content selections for an authorized period of time.

11. A method of multicasting digital content comprising:
multicasting a terrestrial digital television signal that includes a plurality of different encrypted digital content selections from a broadcaster including simultaneously broadcasting divided portions of the signal with each respective divided portion carrying just one of the different encrypted digital content selections;
receiving the digital television signal with a high definition television tuner and storing the plurality of different encrypted digital content selections in a memory; and
accessing at least one of the stored plurality of different encrypted digital content selections from the memory with a decryption key for an authorized period of time; and
obtaining the decryption key by purchase through a return communication link from at least one of a content provider, the broadcaster, and an intermediary.

12. The method of claim 11 wherein multicasting the terrestrial digital television signal comprises:
performing the multicasting on a repeating periodic basis and receiving the digital television signal comprises receiving the multicasted signal on the periodic basis including, storing a current periodic plurality of different digital content selections in the memory over a prior periodic plurality of different digital content selections stored in the memory.

13. The method of claim 11 wherein multicasting the terrestrial digital television signal comprises:
encrypting each of the plurality of different encrypted digital content selections so that the decryption key must be obtained each time that the encrypted digital content selection is to be accessed from the memory.

14. The method of the claim 11 wherein multicasting the terrestrial digital broadcast signal content comprises:
performing the multicasting at non-peak broadcast hours wherein the plurality of different encrypted digital content selections comprise a plurality of new release movies.

15. The method of claim 11 wherein obtaining the decryption key for purchase comprises defining in the decryption key unlimited access to the at least one digital content selection and instructing the memory to prevent deletion of the at least one unlimited access digital content selection from memory during periodic reception of multicasted digital content selections.

16. The method of claim 14 wherein obtaining the decryption key for purchase comprises:
requesting and receiving, with a mobile computing device, the decryption key from at least one of the broadcaster, the content provider, and the intermediary;
making payment wirelessly with the mobile computing device to at least one of the broadcaster, the content provider, and the intermediary; and
applying the decryption key from the mobile computing device to access the at least one encrypted digital content selection.

17. The method of claim 11 wherein multicasting the signal comprises:
multicasting a selection menu of the plurality of different encrypted digital content selections;
accessing the at least one digital content selection comprises selecting the at least one digital content selection from the selection menu; and
wherein storing the plurality of different digital content selections comprises maintaining storage in the consumer media unit of only the selected at least one digital content selections.

18. The method of claim 17 and further comprising:
continuously receiving with the high definition television tuner, and storing into a buffer portion of the memory of the consumer media unit, a time-limited portion of the plurality of different digital content selections from the digital broadcast signal;
selecting to purchase the at least one digital content selection from the selection menu wherein the at least one digital content selection is being broadcasted in the digital broadcast signal in real-time simultaneously with the selection to purchase;

preserving, at the time of selection to purchase, the time-limited portion of the at least one encrypted digital content selection from the buffer portion of the memory;

storing into the memory the selected at least one encrypted digital content selection from the broadcast signal as it is being broadcasted from the time of selection to purchase until completion of the broadcast of the at least one encrypted digital content selection;

merging the stored time-limited portion of the at least one encrypted digital content selection with a remaining portion of the at least one digital content selection that is stored after the selection to purchase to form a merged at least one encrypted digital content selection; and applying the decryption key to the stored merged at least one encrypted first digital content selection for accessing the merged at least one encrypted digital content selection from the memory.

19. A computer-readable medium having computer-executable instruction for performing a method of encrypting a multicasted, high definition television, digital content selection for storage in a memory of a consumer media unit, the method comprising:

providing a terrestrial high definition television signal that includes a plurality of different digital content selection for purchase, the terrestrial high definition television signal being operable to be multicasted on a repeating periodic basis via:

broadcasting simultaneously a multiplexed array of signal portions of the television signal wherein each respective signal portion of the multiplexed array carries just one of the respective different encrypted content selections;

applying an encryption key to the one of the plurality of different digital content selections via at least one of an intermediary, a high definition television broadcaster, and a content provider;

building the encryption key to include at least one of a plurality of security identifiers comprising:

a serial number configured for uniquely identifying each copy of the digital content selection;

a content tag configured for uniquely identifying the content to which the decryption key applies;

a source tag configured for identifying a source, including at least one of a HDTV broadcaster, content provider, and datacast intermediary, from which the digital content selection originated; and an authorization period configured for specifying a period of time in which access to the digital content selection is authorized.

20. The medium of claim 19 and further comprising:

building a decryption key including specifying at least one of the plurality of security identifiers and additionally specifying a consumer identifier as an additional security identifier, with the consumer identifier configured for uniquely identifying a consumer media unit at which access to the encrypted digital content selection is authorized; and permanently attaching the at least one of the security identifiers and the consumer identifier of the decryption key to the digital content selection.

* * * * *

UNITED STATES PATENT AND TRADEMARK OFFICE
CERTIFICATE OF CORRECTION

PATENT NO. : 7,594,109 B2  Page 1 of 1
APPLICATION NO. : 10/744805
DATED : September 22, 2009
INVENTOR(S) : Mark W. Minne It is certified that error appears in the above-identified patent and that said Letters Patent is hereby corrected as shown below:

In column 15, line 67, in Claim 11, after "memory;" delete "and".

In column 16, line 24, in Claim 14, after "of" delete "the".

In column 16, line 26, in Claim 14, after "at" insert -- a --.

Signed and Sealed this

Twenty-first Day of December, 2010

David J. Kappos
*Director of the United States Patent and Trademark Office*